US012322874B2

(12) United States Patent
Yang et al.

(10) Patent No.: US 12,322,874 B2
(45) Date of Patent: Jun. 3, 2025

(54) ANTENNA MODULE

(71) Applicant: Wistron Corporation, New Taipei (TW)

(72) Inventors: Cheng-Chieh Yang, New Taipei (TW); Po Yu Chen, New Taipei (TW); Sheng Hui Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 293 days.

(21) Appl. No.: 18/180,128

(22) Filed: Mar. 8, 2023

(65) Prior Publication Data

US 2024/0222866 A1 Jul. 4, 2024

(30) Foreign Application Priority Data

Jan. 4, 2023 (TW) ................................ 112100271

(51) Int. Cl.

| | |
|---|---|
| ***H01Q 9/42*** | (2006.01) |
| ***H01Q 5/371*** | (2015.01) |
| ***H01Q 5/378*** | (2015.01) |
| ***H01Q 21/28*** | (2006.01) |

(52) U.S. Cl.

CPC ............ *H01Q 5/378* (2015.01); *H01Q 5/371* (2015.01); *H01Q 9/42* (2013.01); *H01Q 21/28* (2013.01)

(58) Field of Classification Search

CPC ........ H01Q 1/243; H01Q 5/371; H01Q 5/378; H01Q 9/42; H01Q 21/28

See application file for complete search history.

(56) References Cited

U.S. PATENT DOCUMENTS

| | | | | |
|---|---|---|---|---|
| 10,622,702 | B2 * | 4/2020 | Guo ......................... | H01Q 1/44 |
| 10,916,846 | B2 * | 2/2021 | Desclos ................. | H01Q 5/328 |
| 2014/0306855 | A1 | 10/2014 | Tsai et al. | |
| 2015/0042517 | A1 | 2/2015 | Chang et al. | |

FOREIGN PATENT DOCUMENTS

| | | |
|---|---|---|
| TW | 201440319 | 10/2014 |

* cited by examiner

*Primary Examiner* — Daniel Munoz

(74) *Attorney, Agent, or Firm* — JCIPRNET

(57) ABSTRACT

An antenna module including a substrate, a main antenna and a parasitic antenna is provided. The substrate has a ground. The main antenna is disposed on the substrate. The main antenna includes a first irradiating portion, a feeding portion and a first grounding portion, and the first grounding portion is connected to the ground. The parasitic antenna is disposed on the substrate. The parasitic antenna includes a second irradiating portion and a second grounding portion, and the second grounding portion is connected to the ground. An extending direction of the first irradiating portion and an extending direction of at least a part of the second irradiating portion are perpendicular to each other.

9 Claims, 2 Drawing Sheets

ANTENNA MODULE

CROSS-REFERENCE TO RELATED APPLICATION

This application claims the priority benefit of Taiwan application serial no. 112100271, filed on Jan. 4, 2023. The entirety of the above-mentioned patent application is hereby incorporated by reference herein and made a part of this specification.

BACKGROUND

Technical Field

The present disclosure relates to an electronic component, and in particular to an antenna module.

Description of Related Art

Wearable electronic devices have gradually become popular in the consumer market. In order to comply with the thin and light design trend, the size of the wearable electronic device is limited, so the space for disposing the antenna module therein is also limited. Therefore, the ground size of the antenna module of the wearable electronic device is limited, resulting in insufficient bandwidth of low frequency band of the antenna module and hard to meet requirements of the specification.

SUMMARY

The disclosure provides an antenna module, which can overcome the issue of insufficient bandwidth at low frequencies.

The antenna module of the present disclosure includes a substrate, a main antenna and a parasitic antenna. The substrate has a ground. The main antenna is disposed on the substrate. The main antenna includes a first irradiating portion, a feeding portion and a first grounding portion, and the first grounding portion is connected to the ground. The parasitic antenna is disposed on the substrate and coupled to the main antenna. Parasitic antenna includes a second irradiating portion and a second grounding portion, the second grounding portion is connected to the ground. The extending direction of the first irradiating portion is perpendicular to at least part of the extending direction of the second irradiating portion.

In an embodiment of the present disclosure, the main antenna and the parasitic antenna at least partially overlap in the extending direction of the second irradiating portion.

In an embodiment of the present disclosure, the main antenna is a coupling feed type antenna.

In an embodiment of the present disclosure, the second irradiating portion includes a first segment and a second segment, the extending direction of the first irradiating portion is perpendicular to an extending direction of the first segment, and the extending direction of the first irradiating portion is parallel to an extending direction of the second segment.

In an embodiment of the present disclosure, the substrate has a first edge and a second edge perpendicular to each other, the first irradiating portion extends along the first edge, and the at least part of the second irradiating portion extends along the second edge.

In an embodiment of the present disclosure, a coupling between the parasitic antenna and the main antenna is configured to increase a bandwidth of low frequency band of the antenna module.

In an embodiment of the present disclosure, the antenna module further includes a tuner, wherein the tuner is disposed on the substrate and connected between the first grounding portion and the ground.

In an embodiment of the present disclosure, the tuner is an aperture tuner.

In an embodiment of the present disclosure, the antenna module further includes a tuner, wherein the tuner is disposed on the substrate and connected between the second grounding portion and the ground.

Based on the above, in addition to an existing main antenna, the antenna module of the present disclosure further includes a parasitic antenna for coupling to the main antenna. Additional operating modes can be coupled by the parasitic antenna such that the bandwidth of low frequency band is increased, thereby overcoming the issue of insufficient bandwidth of low frequency band, so that the antenna module has good signal transmission and reception efficiency and good impedance matching. In addition, an extending direction of at least part of the second irradiating portion of the parasitic antenna is configured to be perpendicular to an extending direction of the first irradiating portion of the main antenna, so that the main antenna and the parasitic antenna are in good isolation.

DESCRIPTION OF THE EMBODIMENTS

Figure 1:
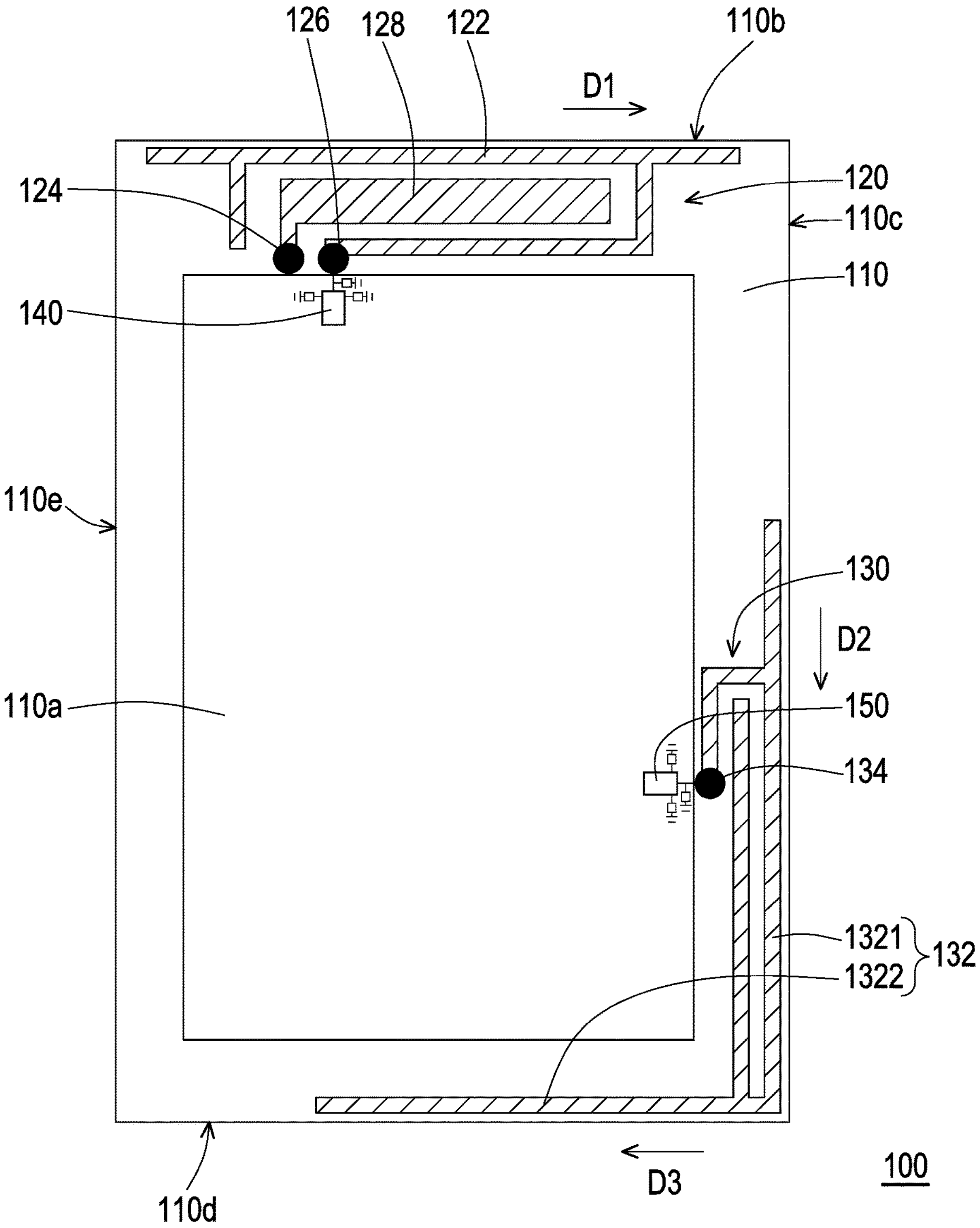
FIG. 1 is a schematic diagram of an antenna module according to an embodiment of the present disclosure.

FIG. 1 is a schematic diagram of an antenna module according to an embodiment of the present disclosure. Please refer to FIG. 1, an antenna module 100 of this embodiment is, for example, applied to wearable electronic devices or other types of electronic devices, and includes a substrate 110 and a main antenna 120. The substrate 110 has a ground 110*a*. The main antenna 120 is, for example, an LTE antenna or other types of antennas. The main antenna 120 is disposed on the substrate 110 and includes a first irradiating portion 122, a feeding portion 124 and a first grounding portion 126. The first grounding portion 126 is connected to the ground 110*a* of the substrate 110.

The antenna module 100 of this embodiment further includes a parasitic antenna 130. The parasitic antenna 130 is disposed on the substrate 110 and coupled to the main antenna 120. The parasitic antenna 130 includes a second irradiating portion 132 and a second grounding portion 134, and the second grounding portion 134 is connected to the ground 110*a*. An extending direction D1 of the first irradiating portion 122 of the main antenna 120 and an extending direction D2 of at least a part of the second irradiating portion 132 of the parasitic antenna 130 are perpendicular to each other.

As mentioned above, the antenna module 100 of this embodiment not only includes the existing main antenna 120, but also includes a parasitic antenna 130 for being coupled to the main antenna 120. Additional operating modes can be coupled by the parasitic antenna 130 to increase the bandwidth of low frequency band, so as to overcome the problem of insufficient bandwidth of low frequency band, so that the antenna module 100 has good signal transceiving efficiency and good impedance matching. In addition, the extending direction of at least part of the second irradiating portion 132 of the parasitic antenna 130 is configured to be perpendicular to the extending direction of the first irradiating portion 122 of the main antenna 120, so that the main antenna 120 and the parasitic antenna 130 are in good isolation. In addition, the parasitic antenna 130 does not have a feeding portion, and is in good isolation from the main antenna 120.

Figure 2:
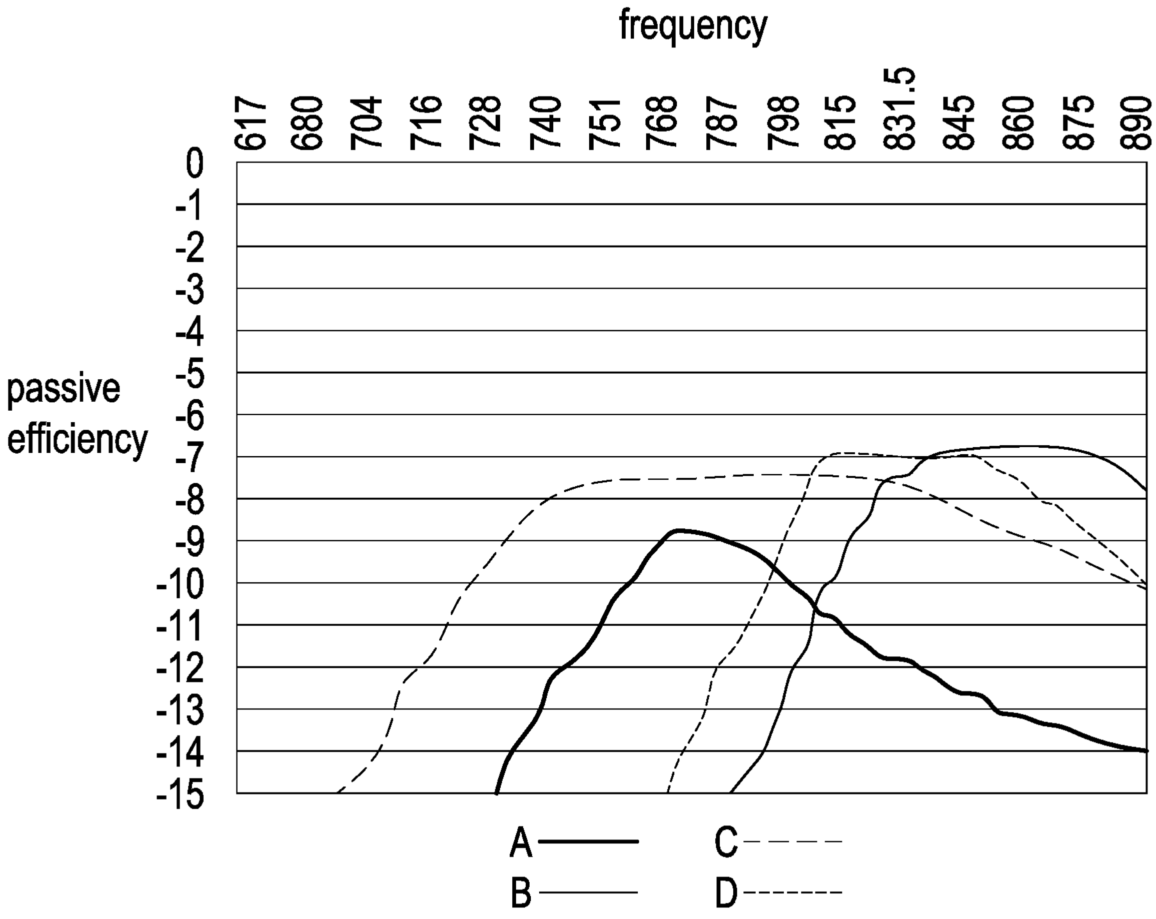
FIG. 2 is a comparison of passive efficiencies between the antenna module in FIG. 1 and a conventional antenna module.

In addition, by adding the parasitic antenna 130 to the antenna module 100 of this embodiment as described above, performances of the antenna module 100 in total radiated power (TRP), total isotropic sensitivity (TIS) and passive efficiency can be improved. FIG. 2 is a comparison of passive efficiencies between the antenna module in FIG. 1 and a conventional antenna module. Herein, C and D represent the passive efficiencies of the antenna module in this embodiment in two different low frequency bands, and A and B represent the passive efficiencies of the conventional antenna module in the two different low frequency bands. It can be seen from FIG. 2 that the passive efficiency of the antenna module 100 in this embodiment is more favorable than that of conventional antenna modules.

The antenna module 100 of this embodiment further includes two tuners 140, 150, which, for example, both are aperture tuners. The tuner 140 is disposed on the substrate 110 and connected between the first grounding portion 126 of the main antenna 120 and the ground 110*a*. The tuner 150 is disposed on the substrate 110 and connected between the second grounding portion 134 of the parasitic antenna 130 and the ground 110*a*. The frequency band range corresponding to the main antenna 120 and the parasitic antenna 130 can be adjusted by the tuners 140 and 150 respectively.

In this embodiment, low frequency band range, medium frequency band range, and high frequency band range of the main antenna 120 are, for example, about 617~960 MHz, 1710~2220 MHz, and 2300~2690 MHz, respectively. In other embodiments, the low frequency band range, the middle frequency band range, and the high frequency band range of the main antenna 120 may be other values, which are not limited in the present disclosure. The coupling of the parasitic antenna 130 and the main antenna 120 can, for example, increase the bandwidth of one of the low frequency band ranges (such as 824~894 MHz or 746~787 MHz) of the antenna module 100.

A specific configuration of the main antenna 120 and the parasitic antenna 130 in this embodiment will be further described below.

Please refer to FIG. 1, the main antenna 120 of this embodiment is, for example, a coupling feed type antenna. More specifically, the main antenna 120 further includes a coupling portion 128 in addition to the aforementioned first irradiating portion 122, the feeding portion 124 and first grounding portion 126. The coupling portion 128 is connected to the feeding portion 124 so that the feeding portion 124 can be coupled to the first irradiating portion 122 through the coupling portion 128. In other embodiments, the main antenna 120 can be other types of antennas, and the present disclosure is not limited thereto.

In this embodiment, the substrate 110 is, for example, rectangular and has a first edge 110*b*, a second edge 110*c*, a third edge 110*d*, and a fourth edge 110*e*. The first edge 110*b* and the third edge 110*d* are opposite and parallel to each other, the second edge 110*c* and the fourth edge 110*e* are opposite and parallel to each other, the second edge 110*c* and the fourth edge 110*e* are connected between the first edge 110*b* and the third edge 110*d* and are perpendicular to the first edge 110*b* and third edge 110*d*.

As described above, the first irradiating portion 122 of the main antenna 120 extends along the first edge 110*b* of the substrate 110. The second irradiating portion 132 of the parasitic antenna 130 includes a first segment 1321 and a second segment 1322 perpendicular to each other. The first segment 1321 and the second segment 1322 extend along the second edge 110*c* and the third edge 110*d* of the substrate 110 respectively. Therefore, the extending direction D1 of the first irradiating portion 122 is perpendicular to the extending direction D2 of the first segment 1321 of the second irradiating portion 132, and the extending direction D1 of the first irradiating portion 122 is parallel to the extending direction D3 of the second segment 1322 of the second irradiating portion 132. In addition, the main antenna 120 and the parasitic antenna 130 at least partially overlap in the extending direction D2 of the first segment 1321 of the second irradiating portion 132. Accordingly, the main antenna 120 and the parasitic antenna 130 are not too far away from each other in the extending direction D1 of the first irradiating portion 122, so that the parasitic antenna 130 can be successfully coupled to the main antenna 120. In other embodiments, the main antenna 120 and the parasitic antenna 130 may be configured in other manners on the substrate 110, which is not limited in the present disclosure.

In sum, the antenna module of the present disclosure not only includes the existing main antenna, but also adds a parasitic antenna for coupling to the main antenna. Additional operating modes can be coupled by the parasitic antenna to increase the bandwidth of low frequency band, so as to overcome the issue of insufficient bandwidth of low frequency band, so that the antenna module has good signal transceiving efficiency and good impedance matching. In addition, the extending direction of at least a part of the second irradiating portion of the parasitic antenna is configured to be perpendicular to the extending direction of the first irradiating portion of the main antenna, so that the main antenna and the parasitic antenna are in good isolation.

What is claimed is:

1. An antenna module comprising:

a substrate having a ground;

a main antenna disposed on the substrate, wherein the main antenna comprises a first irradiating portion, a feeding portion and a first grounding portion, and the first grounding portion is connected to the ground; and a parasitic antenna disposed on the substrate and coupled to the main antenna, wherein the parasitic antenna comprises a second irradiating portion and a second grounding portion, and the second grounding portion is connected to the ground, an extending direction of the first irradiating portion is perpendicular to an extending direction of at least part of the second irradiating portion, wherein the substrate has a first edge, a second edge, and a third edge, and the first edge and the third edge are opposite and parallel to each other, the second edge is connected between the first edge and the third edge and is perpendicular to the first edge and third edge, wherein the first irradiating portion of the main antenna extends along the first edge of the substrate, the second irradiating portion of the parasitic antenna includes a first segment and a second segment perpendicular to each other, the first segment and the second segment extend along the second edge and the third edge of the substrate respectively.

2. The antenna module as claimed in claim 1, wherein the main antenna and the parasitic antenna at least partially overlap in the extending direction of the second irradiating portion.

3. The antenna module as claimed in claim 1, wherein the main antenna is a coupling feed type antenna.

4. The antenna module as claimed in claim 1, wherein the extending direction of the first irradiating portion is perpendicular to an extending direction of the first segment, and the extending direction of the first irradiating portion is parallel to an extending direction of the second segment.

5. The antenna module as claimed in claim 1, wherein a coupling between the parasitic antenna and the main antenna is configured to increase a bandwidth of low frequency band of the antenna module in.

6. The antenna module as claimed in claim 1, further comprises a tuner, wherein the tuner is disposed on the substrate and connected between the first grounding portion and the ground.

7. The antenna module as claimed in claim 6, wherein the tuner is an aperture tuner.

8. The antenna module as claimed in claim 1, further comprises a tuner, wherein the tuner is disposed on the substrate and connected between the second grounding portion and the ground.

9. The antenna module as claimed in claim 8, wherein the tuner is an aperture tuner.

* * * * *